F. M. HARTMAN.
Self-Acting Wagon-Brakes.
No. 133,644. Patented Dec. 3, 1872.
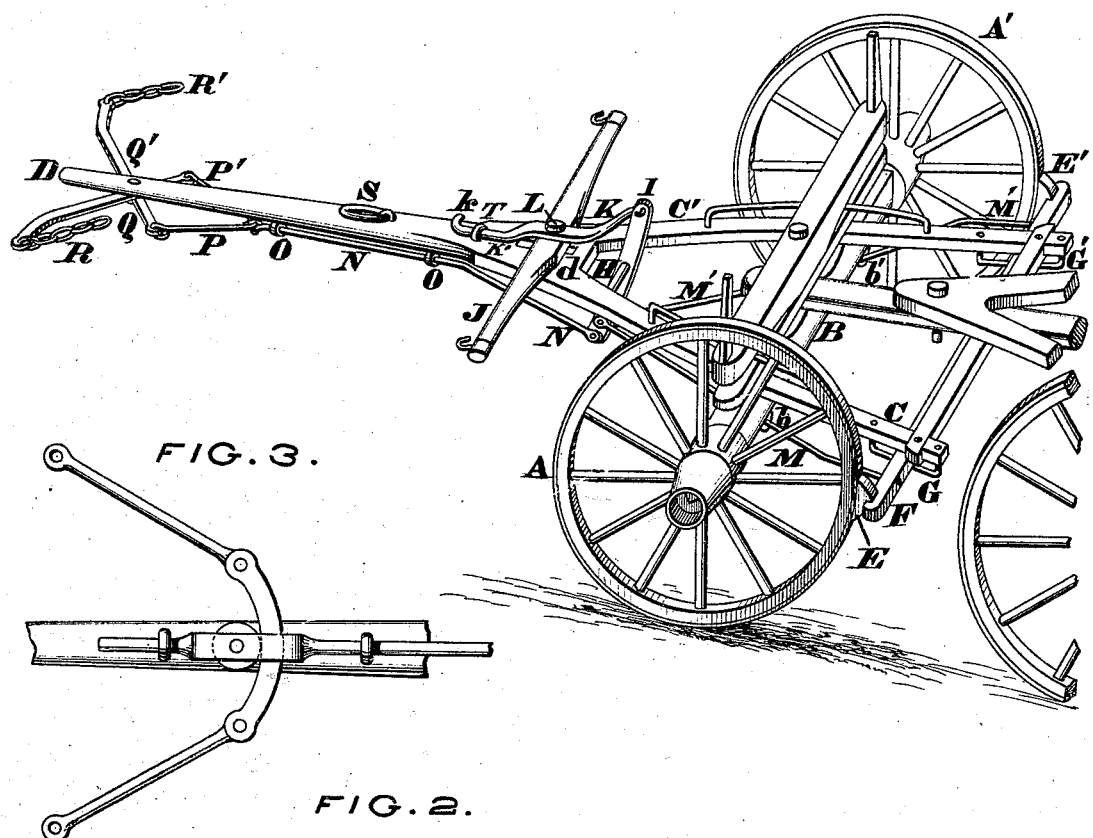
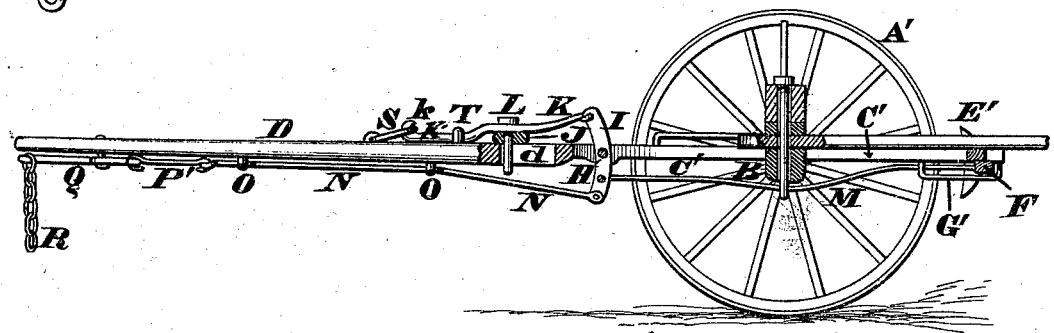
Attest.
Jas. H. Layman
Walter Allen
Francis M. Hartman
By Knight Bros.
Att'ys.

UNITED STATES PATENT OFFICE.

FRANCIS M. HARTMAN, OF MARATHON, OHIO, ASSIGNOR OF ONE-HALF HIS RIGHT TO JOHN C. McCONN, OF SAME PLACE.

IMPROVEMENT IN SELF-ACTING WAGON-BRAKES.

Specification forming part of Letters Patent No. 133,644, dated December 3, 1872.

*To all whom it may concern:*

Be it known that I, FRANCIS M. HARTMAN, of Marathon, Clermont county, Ohio, have invented a Self-Acting Wagon-Brake, of which the following is a specification:

Nature and Objects of the Invention.

This is an improved form of those brakes for wagons and other vehicles which operate automatically to lock the wheels, and thus arrest the descent of the vehicle, and is especially designed for such vehicles as have a rigid tongue or pole to which a span or pair of animals are hitched.

General Description.

Figure 1 is a perspective view of the fore gear and tongue of a wagon provided with my self-acting brake. Fig. 2 is a longitudinal section of the same. Fig. 3 represents a modification of my links.

A A' represent the fore wheels; B, the axle-tree; C C', the fore hounds; and D, the tongue of a customary four-wheel wagon of that kind whose tongue and fore hounds are in one rigid piece. The rubbers E E' may be of any approved form, and are attached to a customary bar, F, supported and guided by staples G G', which depend from the fore hounds. Pivoted beneath the tongue, at H, and passing up between the fore hounds, is a lever, I, whose upper end is connected to customary whiffletree J by means of hammer-strap K and hammer-bolt L, which latter occupies a slot, $d$, in the tongue. The rubber-bar F is connected to lever I by rods M M', which are carried through guide-eyes $b\ b'$ that depend from the axle B, and said rods have their forward ends attached to the said lever I a little below its pivot H. A rod, N, passes from the lower extremity of lever I through guide-eyes O depending from the tongue, and is connected by links P P' with the rear extremities of a pair of intersecting levers, Q Q', to whose forward ends are connected a pair of customary neck-yoke chains, R R'. A prolongation, K', of the strap K, in front of the whiffletree, has an upturned lip, $k$, to receive (when desired to back the wagon without locking) a shackle, S, which is linked to the upper side of the tongue. This prolongation occupies a guide-eye, T, attached to the tongue.

Operation.

During the ordinary operation of the wagon upon a level or upon an up-grade the brake remains inoperative, the bolt L of the whiffletree simply bearing against the forward end of the slot $d$; but the instant that the wagon descends a steep declivity the stress upon the yoke-chain operates through the rods and lever to force the rubbers firmly against the peripheries of the fore wheels, so as to automatically lock the wagon and arrest its descent with a force proportioned to the steepness of the declivity and the weight of the load. The instant that the wagon reaches a level or but slightly descending grade the draft upon the whiffletree reverses the lever I and releases the brake.

When it is desired to back the wagon the brake is rendered inoperative by simply engaging the shackle S over the lip $k$ of bar K K'.

The above-described preferred form of my invention may be varied in non-essential particulars; for example, the lever I may pass up through the slot $d$ and be connected directly to the whiffletree, and the links P P' may be connected by a chain or an arc working behind a sheave in the rod N, so as to equalize the labor of the horses.

Since making this invention I have become aware of devices analogous to mine in construction and object, and I consequently disavow any broad claim to a rubber or pair of rubbers operated automatically by a rod and lever in connection with a rigid tongue; but

I claim as new and of my invention—

1. The combination of levers Q Q' and I, links P P', pull-rod N, connecting-rods M M', whiffletree-strap K, whiffletree-bolt L, and slot $d$ with the rigid tongue D, sliding rubber-bar F, and whiffletree J, all constructed, arranged, and operating as herein shown and described, for the purpose specified.

2. The sliding whiffletree-strap K, constructed with the extension K' and hook or lip $k$, in combination with the shackle S, arranged and operating as set forth, as means for rendering the brake mechanism inoperative while backing.

In testimony of which invention I hereunto set my hand.

F. M. HARTMAN.

Witnesses:
GEO. H. KNIGHT,
JAMES H. LAYMAN.